United States Patent
Shirai (10) Patent No.: US 8,390,852 B2
(45) Date of Patent: Mar. 5, 2013

(54) PRINTING APPARATUS AND CONTROL METHOD TO PRODUCE UPDATED PAGES

(75) Inventor: Toshiaki Shirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 854 days.

(21) Appl. No.: 12/494,597

(22) Filed: Jun. 30, 2009

(65) Prior Publication Data

US 2010/0002258 A1 Jan. 7, 2010

(30) Foreign Application Priority Data

Jul. 1, 2008 (JP) ................................. 2008-172246

(51) Int. Cl.
*G06F 3/12* (2006.01)
(52) U.S. Cl. ...... 358/1.15; 358/1.9; 358/1.14; 358/1.13; 358/1.1
(58) Field of Classification Search ........................ None
See application file for complete search history.

(56) References Cited

U.S. PATENT DOCUMENTS

| 7,990,577 B2* | 8/2011 | Aschenbrenner et al. ..... 358/1.9 |
| 2003/0174358 A1* | 9/2003 | Sasage ......................... 358/1.15 |
| 2003/0234948 A1* | 12/2003 | Sasaki ......................... 358/1.13 |

FOREIGN PATENT DOCUMENTS

JP  2003-330658 A  11/2003

OTHER PUBLICATIONS

WO 2006/088242, Sakai, Information Processing Apparatus for Processing Print Data, Method thereof and Media in Storage of Control Program of Executing such Methid, published Aug. 24, 2008.*

* cited by examiner

*Primary Examiner* — Benny Q Tieu
*Assistant Examiner* — Paul F Payer
(74) *Attorney, Agent, or Firm* — Canon USA, Inc., IP Division (57) ABSTRACT

A printing apparatus includes a first acquiring unit configured to acquire a print target document; a second acquiring unit configured to acquire update history information about update history of the document acquired by the first acquiring unit; a third acquiring unit configured to acquire print history information about print history of the document, a generating unit configured to generate print image data based on the document, a receiving unit configured to receive a command to print the document, an identifying unit configured to, when the receiving unit receives a command to print the document, identify, as print target image data, the print image data that includes an image of an updated page in the document, based on the update history information acquired by the second acquiring unit and layout information included in the print history information acquired by the third acquiring unit, out of the print image data generated by the generating unit; and a printing unit configured to execute printing based on the print image data identified by the identifying unit.

15 Claims, 9 Drawing Sheets

| DOCUMENT HISTORY: CONFERENCE MATERIAL A. DOC ||
| VERSION | UPDATE PAGE |
| V1.0 | NEW DOCUMENT |
| V1.1 | UPDATE OF PAGES 2, AND 3 |
| V1.2 | UPDATE OF PAGE 5 |

FIG. 5

| PRINT DATE | DOCUMENT VERSION AT TIME OF PRINTING | PERSON EXECUTING PRINTING | PRINT LAYOUT INFORMATION ||| 
| | | | PAPER SIZE | PAPER ORIENTATION | PRINT LAYOUT |
| --- | --- | --- | --- | --- | --- |
| 2007.01.03.15:30 | V1.0 | A | A4 | PORTRAIT | 4in1 |
| 2007.01.10.08:51 | V1.0 | B | A4 | PORTRAIT | 2in1 |
| 2007.01.15.11:20 | V1.1 | A | A4 | PORTRAIT | 4in1 |

FIG. 8

FIG. 9A DOCUMENT 901

FIG. 9B PRINT LAYOUT RESULT 902

FIG. 9C PHYSICAL PAGE PRINT RESULT 903

PRINTING APPARATUS AND CONTROL METHOD TO PRODUCE UPDATED PAGES

BACKGROUND OF THE INVENTION

1. Field of the Invention

The present invention relates to a printing apparatus configured to perform difference printing to produce an updated page and a control method for the printing apparatus.

2. Description of the Related Art

After a document has been printed prior to a conference, which is to be passed out in the conference, it is often necessary to make some amendments to the document and print copies again before the conference.

In this case, if amendments are made to certain pages, in order to reduce waste of resources, only pages that have been updated are printed and used to replace corresponding pages (e.g., see Japanese Patent Application Laid-Open No. 2003-330658).

However, if a document before a revision was printed in a two-sided printing or in a specific print layout, such as a reduction layout, even if only revised pages are printed, since they are in a different printout layout, they cannot be used as replacement pages.

Another problem is that if one tries to print update portions in a manner that suits the specific print layout used in printing before the revision, very complicated setting is required in specifying print target pages, which is quite troublesome.

SUMMARY OF THE INVENTION

According to an aspect of the present invention, a printing apparatus includes a first acquiring unit configured to acquire a print target document; a second acquiring unit configured to acquire update history information about update history of the document acquired by the first acquiring unit; a third acquiring unit configured to acquire print history information about print history of the document; a generating unit configured to generate print image data based on the document; a receiving unit configured to receive a command to print the document; an identifying unit configured to, when the receiving unit receives a command to print the document, identify, as print target image data, the print image data that includes an image of an updated page in the document, based on the update history information acquired by the second acquiring unit and layout information included in the print history information acquired by the third acquiring unit, out of the print image data generated by the generating unit; and a printing unit configured to execute printing based on the print image data identified by the identifying unit.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the invention will be described in detail below with reference to the drawings.

Figure 1:
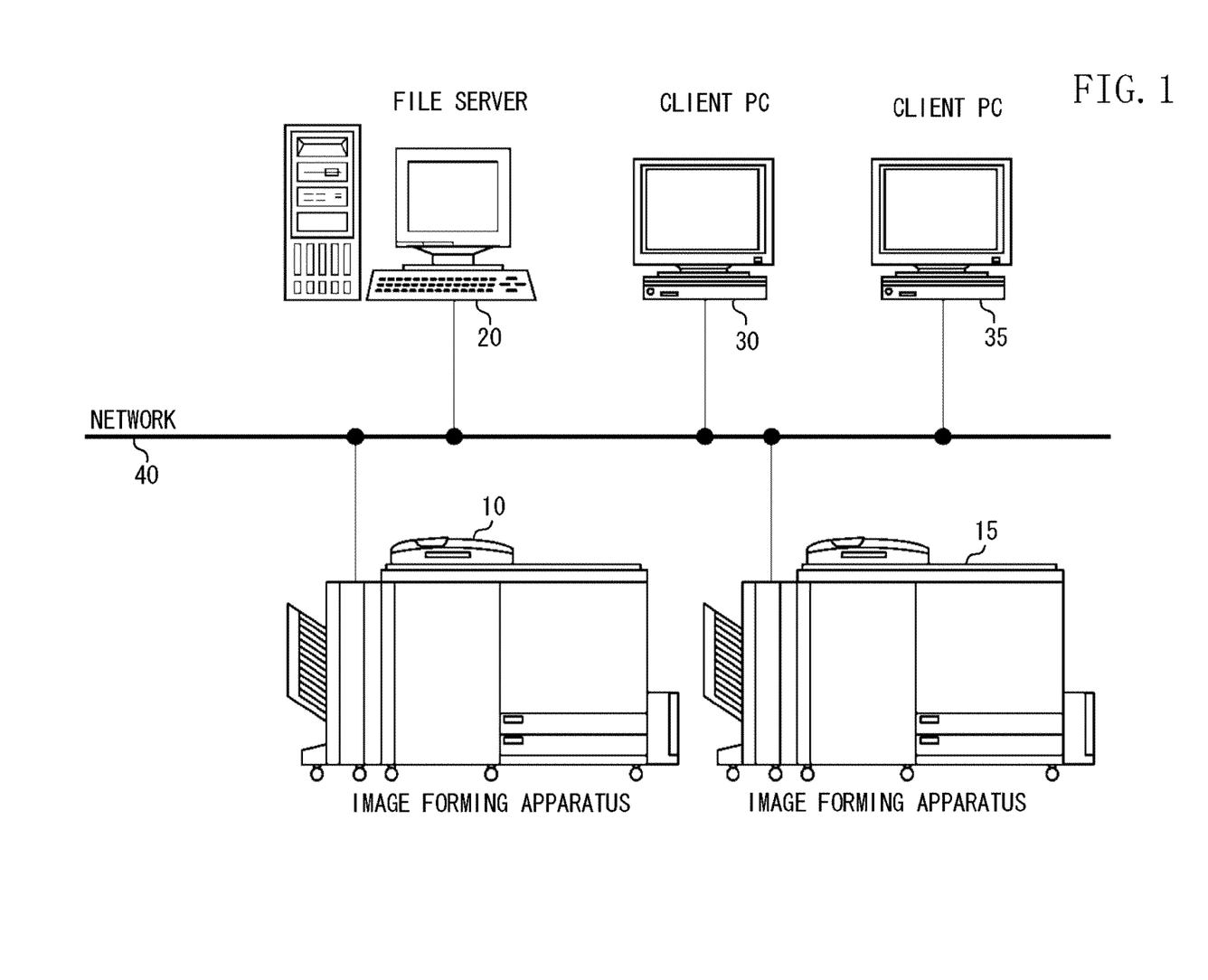
FIG. 1 is a configuration diagram of an image forming system incorporating a printing apparatus according to an embodiment of the present invention.

FIG. 1 is a configuration diagram of an image forming apparatus incorporating a printing apparatus according to an embodiment of the present invention.

In FIG. 1, the image forming system is built by connecting image forming apparatuses 10 and 15, a file server 20, and client PCs 30 and 35 to a network 40.

The image forming apparatuses 10 and 15 (hereinafter represented by the image forming apparatus 10), which are examples of a printing apparatus, include functions, such as scanning, printing and copying.

In this embodiment, the image forming apparatus 10 performs pull printing by acquiring a document stored on the file server 20 and executing a layout process.

The file server 20 manages user information and files generated by the client PCs 30 and 35. In addition, the file server 20 can manage document versions and updated pages.

The client PCs 30 and 35 (hereinafter represented by the client PC 30) are the PC on which the user performs various operations. On his local client PC 30, the user can display, edit, store, and print files stored in the file server 20.

Figure 2:
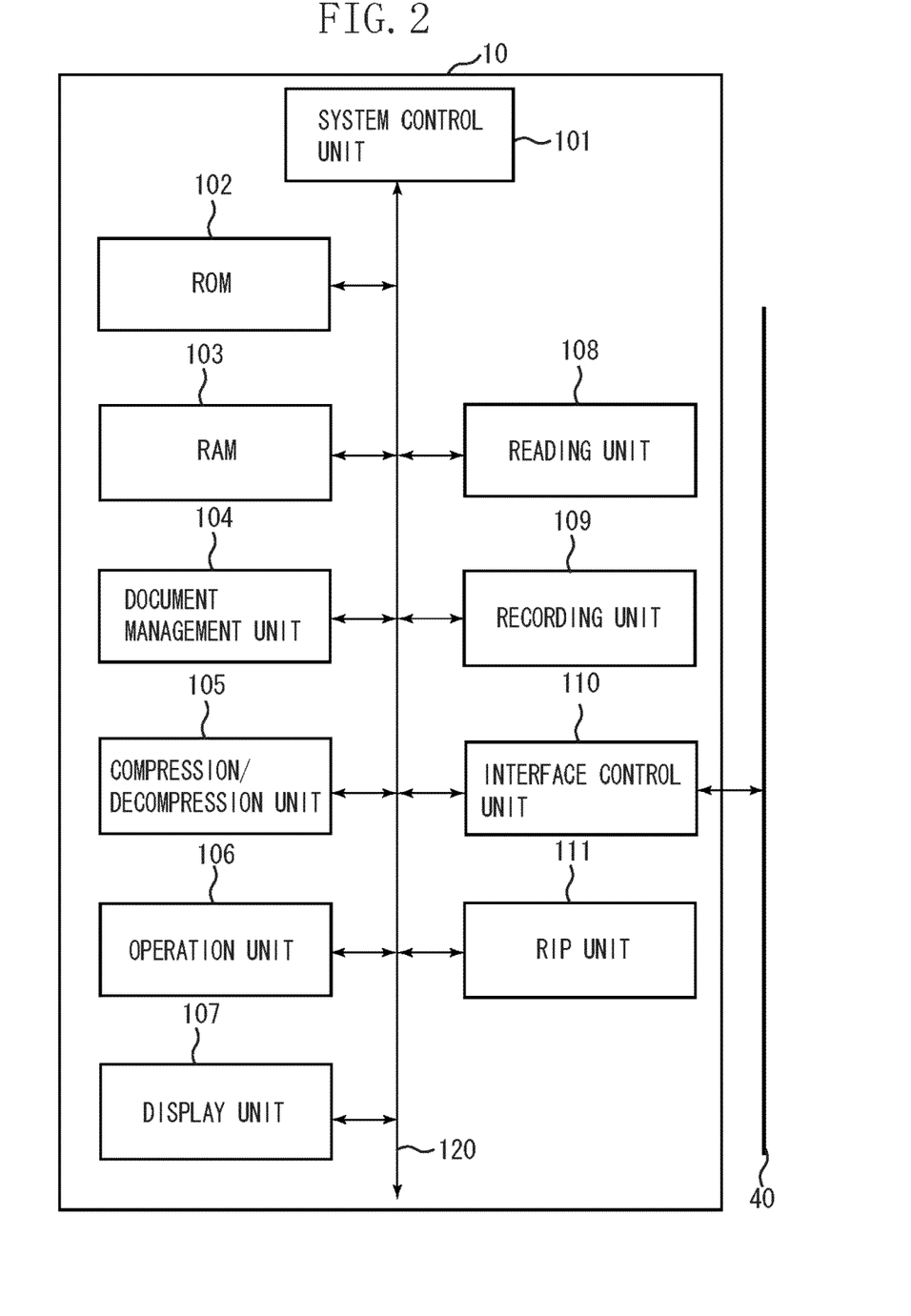
FIG. 2 is a block diagram of the image forming apparatus in FIG. 1.

FIG. 2 is a block diagram illustrating a hardware configuration of the image forming apparatus in FIG. 1.

In FIG. 2, a system control unit 101 includes a central processing unit (CPU) (not illustrated) which is used to control operations of the whole image forming apparatus 10 via a system bus 120.

A read-only memory (ROM) 102 stores, for example, a control program to be executed by the system control unit 101. The control program stored in the ROM 102 is executed by the CPU included in the system control unit 101.

A random access memory (RAM) 103 stores the setting values input by the user, management data of the image forming apparatus, and temporary variables.

A document management unit 104, which is formed by a memory, such as a hard disk, can store a plurality of image data, job data and job management information. For example, the document management unit 104 can store a plurality of image data from the reading unit 108 and print job data input via an interface control unit 110.

A compression/decompression unit 105 compresses or decompresses image data. The compression/decompression unit 105, according to need, compresses image data before image data is stored in the document unit 104 or decompresses compressed image data to the original size when stored data is read out.

An operation unit 106 is formed of keys, which are used by the user to input data or letters. A display unit 107 is constituted by liquid crystal display (LCD) or light emitting diode (LED) that performs various types of visual display or phonetic display. With the achievement of higher resolution in the display unit 107, image data in the document management unit 104 can be previewed to check its resolution and can be printed.

The reading unit 108 is formed of an image sensor such as charge coupled device (CCD) or CS image sensor, and an image processing unit. The reading unit 108 optically reads a document and converts acquired data into electric image data, and performs various types of image processing, such as color processing, binarization processing, and halftone processing to output high-definition image data.

A recording unit 109, which is formed of a printer, such as a laser printer or a inkjet printer, performs various kinds of image processing, such as smoothing or recording density correction, on image data to be recorded, to convert the data into high-definition image data and output on paper.

The interface control unit 110 communicates image data and apparatus information with an information processing apparatus, such as the file server 20, connected via the network 40 or a universal serial bus (USB). Since a known communication control method is used, a detailed description is omitted.

A raster image processing (RIP) unit 111 applies RIP to page description language (PDL) data input from the interface control unit 110. Moreover, the RIP unit 111 can, as needed, store intermediate data of the image data generated during the RIP process and print ready data (bit map data for print or compressed bit map data) back into the document management unit 104.

Figure 3:
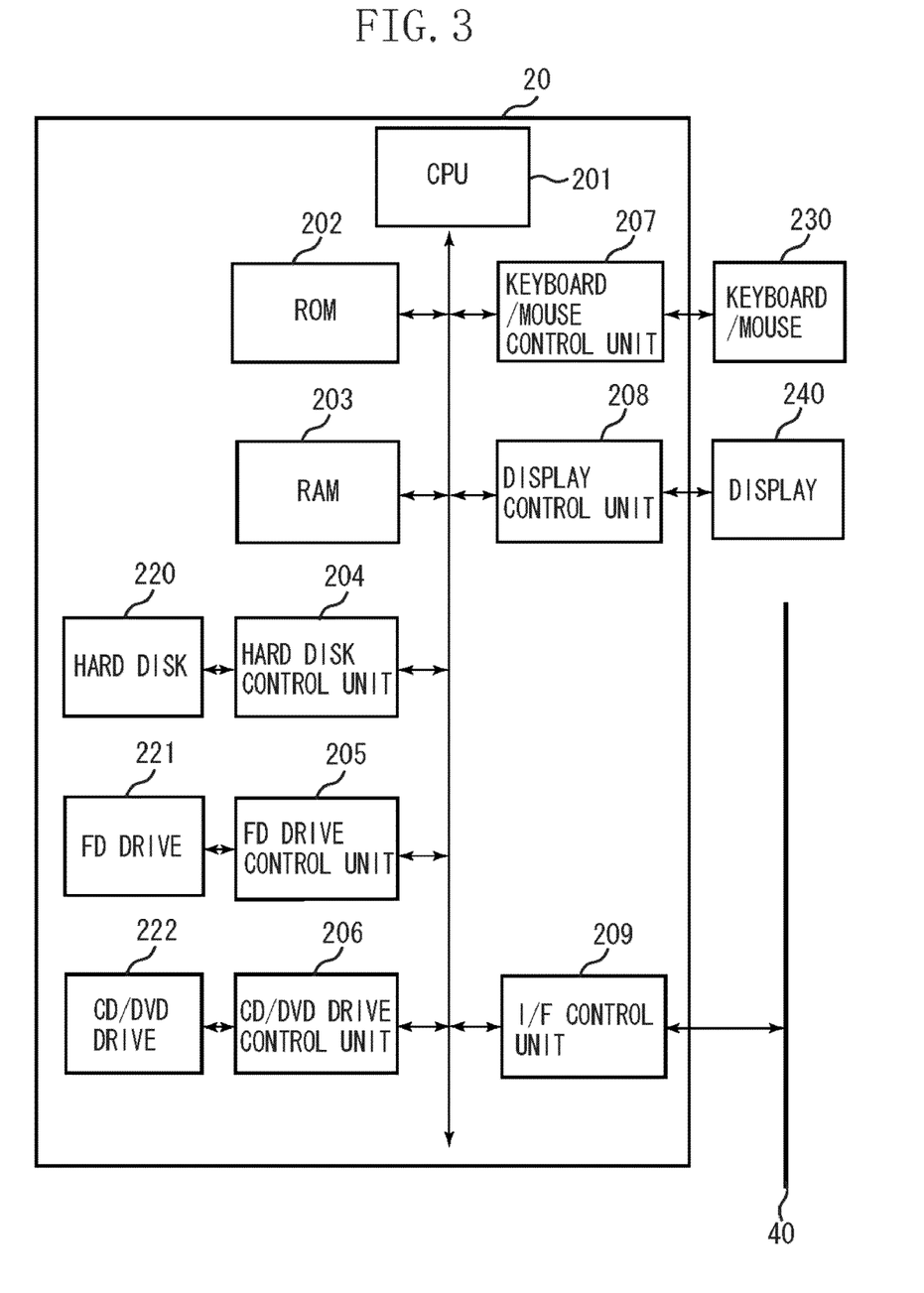
FIG. 3 is a block diagram of the file server in FIG. 1.

FIG. 3 is a block diagram illustrating a hardware configuration of the file server in FIG. 1.

In FIG. 3, a CPU 201 controls the operation of the entire file server according to a program stored in a ROM 202, a RAM 203 or a hard disk 220, or according to a program read out from a floppy disk (FD) drive 221 or compact disc/digital versatile disk (CD/DVD) drive 222.

The ROM 202 stores control programs to be executed by the CPU 201. The RAM 203 temporarily stores programs and image data.

A hard disk control unit 204 controls the hard disk 220 that stores an operating system, various types of application software, and image data.

The hard disk 220 includes the operating system, the various types of application software and driver software, which are installed in the file server 20. The hard disk 220 also includes files and image data.

The application software and the driver software are installed into the hard disk 220 from computer-readable media via the FD drive 221, CD/DVD drive 222. The application software and the driver software can be installed into the hard disk 220 by downloading them via the interface control unit 209.

The FD drive control unit 205 controls the FD drive 221. The CD/DVD drive control unit 206 controls the CD/DVD drive 222.

A keyboard/mouse control unit 207 controls a keyboard/mouse 230, which is used by the user to input commands.

A display control unit 208 controls a display 240 to provide the user with information in various visual forms.

The interface control unit 209 communicates with external terminals of the image forming apparatus 10 or the like connected via the network 40 or USB. Because a known communication control method is used, a detailed description of the control method is omitted.

The client PC 30 may have a basic construction similar to the file server 20.

Figure 4:
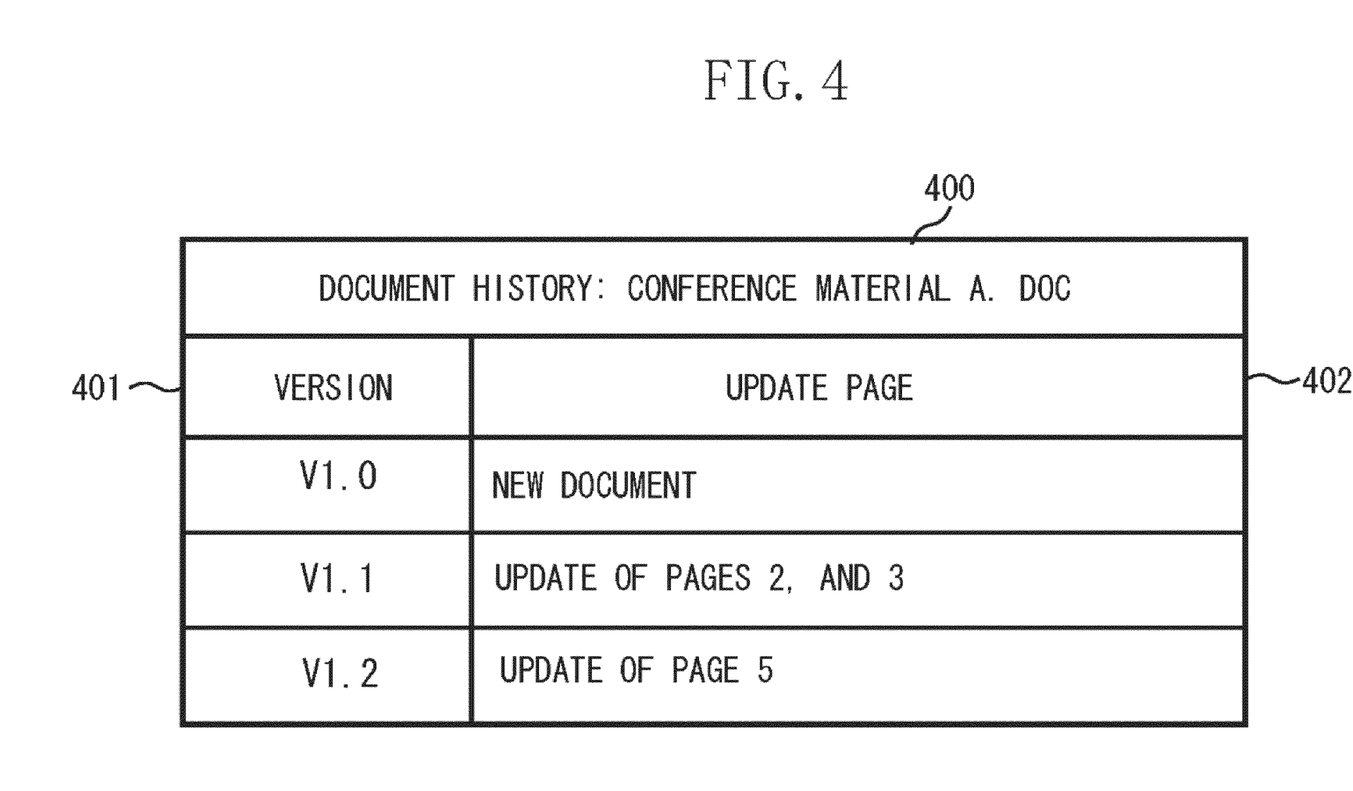
FIG. 4 is a diagram illustrating an example of document history information in the file server in FIG. 3.

FIG. 4 is a diagram illustrating an example of document history information in the file server in FIG. 3.

In FIG. 4, document history information 400, which is stored in the hard disk 220 of the file server 20, is generated for each document managed by the file server 20. As an example of document history information, FIG. 4 shows history information about a document titled "Conference Material A, DOC", which is stored in the hard disk 220 of the file server 20.

The document history information 400 includes updated page information about each version of the document. Each time the document is stored, or the version is updated, the document history information 400 is updated.

A version 401 is version information when the document is stored. An updated page 402 is page information indicating which page is updated when the document is stored.

This exemplary embodiment is described on the assumption that versions 401 and updated pages 402 are stored. However, without using versions 401 or in addition to versions 401, a time stamp may be attached and stored when a document is stored, and update history information may be managed using the time stamps.

Figure 5:
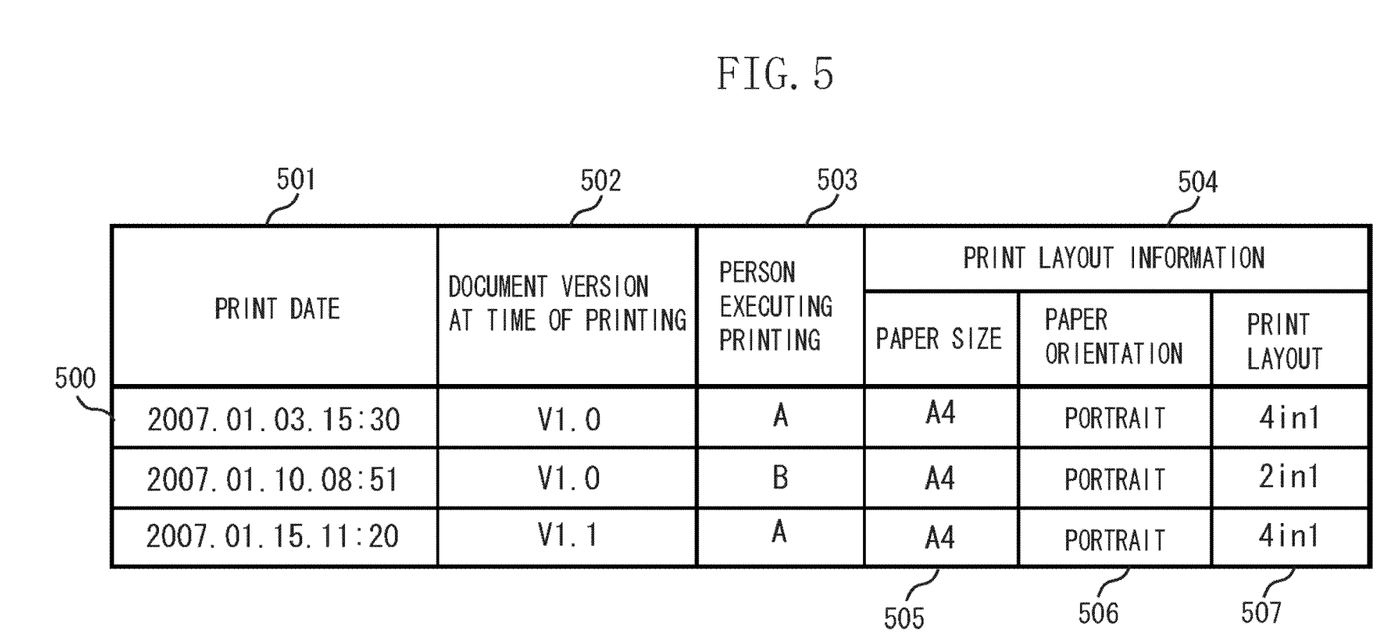
FIG. 5 is a diagram illustrating an example of print history information in the image forming apparatus in FIG. 2.

FIG. 5 is a diagram illustrating an example of print history information in the image forming apparatus in FIG. 2.

Print history information 500 is stored in the document management unit 104 in the image forming apparatus of the image forming apparatus. Each time a document is printed by the image forming apparatus 10, this print history information 500 is generated.

The print history information 500 includes items such as document print dates, document versions, persons who carried out printing, and print layout information, and the print history information 500 is normally updated each time printing is performed.

The print date 501 is information about date when the document was printed. The document version 502 is version information when the document was printed. The person 503 who carried out printing is information about a name of the user who executed printing. The print layout information 504 indicates how an image was laid out on a paper when the document was printed.

In this exemplary embodiment, the print layout information 504 stores information such as paper size 505, paper orientation 506, and print layout 507. In this exemplary embodiment, as a print layout, it is possible to specify an N in 1 layout (a layout in which images for N pages of a document are reduced on a sheet), one-sided printing, and two-sided printing. A combination of those layout methods may also be used. Besides the items described above, if necessary, other information can also be adopted in a layout.

Figure 6:
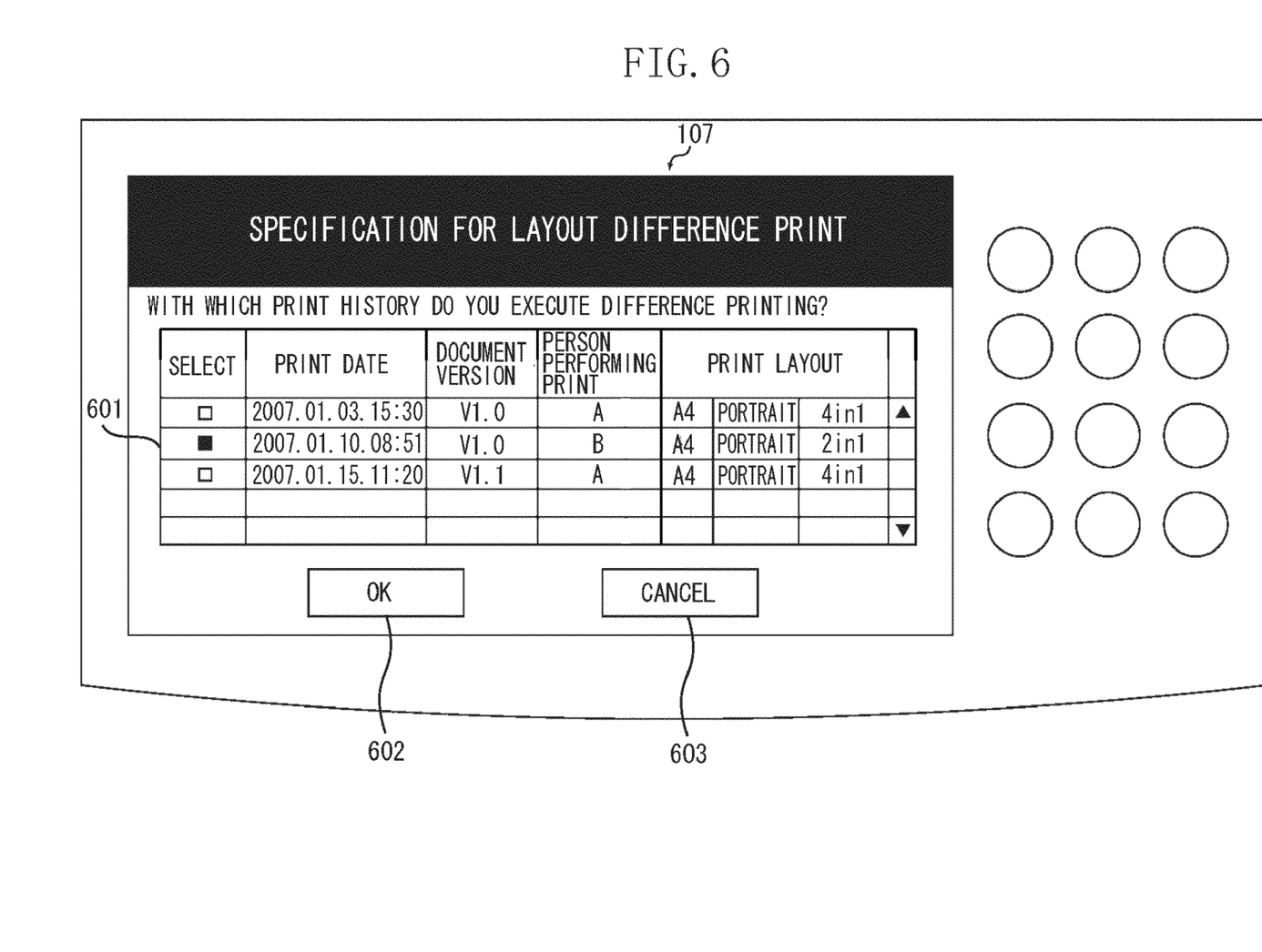
FIG. 6 is a diagram illustrating an example of a screen image of the display unit in the image forming apparatus in FIG. 2.

FIG. 6 illustrates an example of a screen image of the display unit in the image forming apparatus in FIG. 2.

This screen image appears on the display unit 107 when the system control unit 101 of the image forming apparatus 10 executes the control program.

In FIG. 6, the print history list 601 illustrates a list of past print history information about a document on which layout difference printing is to be performed. After a check mark is put in the check box in front of each record of print history, by pressing the OK button 602, it is possible to issue a command to execute layout difference printing from a selected record of print history. The cancel switch 603 is used to cancel a selection.

Figure 7:
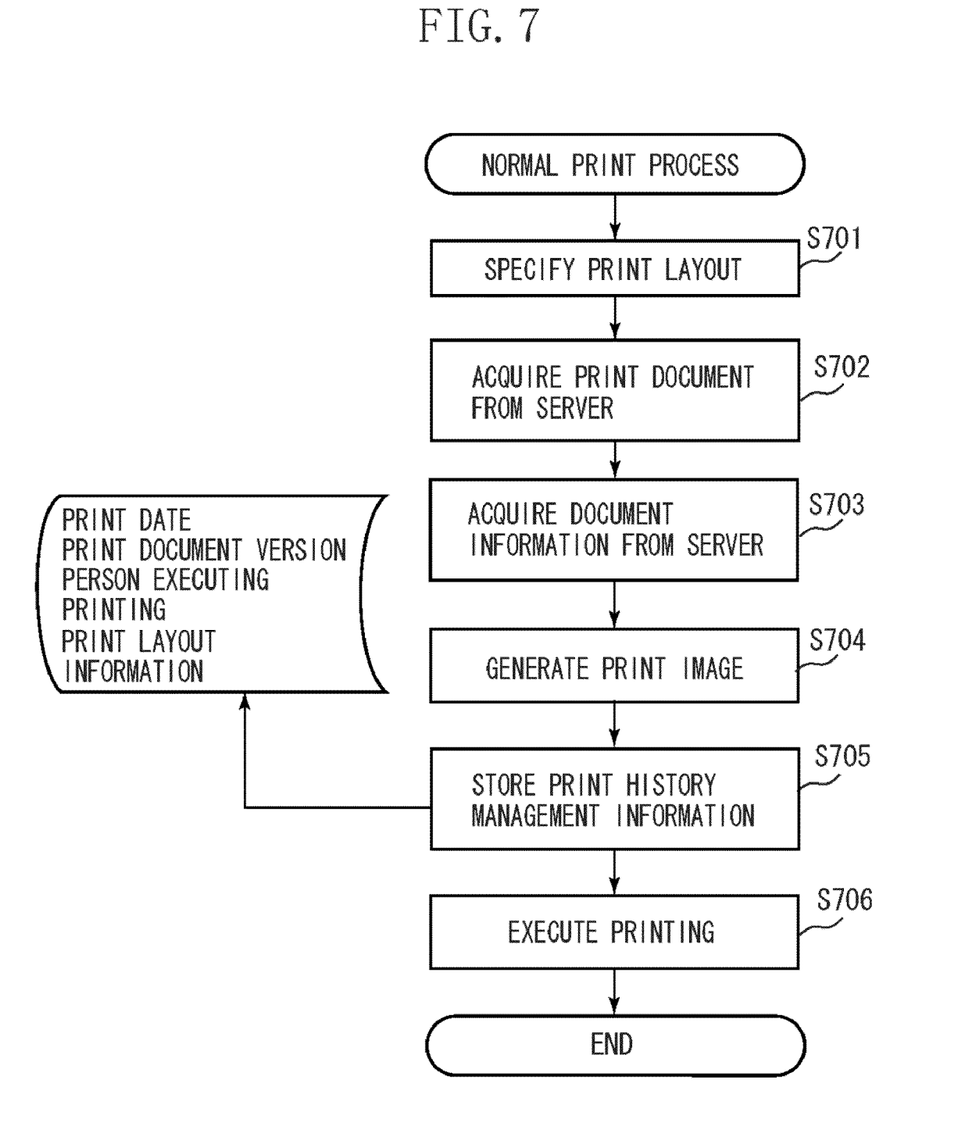
FIG. 7 is a flowchart illustrating a procedure of a normal printing process executed by the image forming apparatus in FIG. 2.

FIG. 7 is a flowchart illustrating a procedure of a normal printing process executed by the image forming apparatus in FIG. 2.

This flowchart is executed under control of the system control unit 101 of the image forming apparatus 10.

In step S701, in response to a pull print command, a print layout is specified from the operation unit 106 of the image forming apparatus 10.

In step S702, the system control unit 101 acquires PDL data (print document) of the pertinent document from the file server 20.

Simultaneously with the acquisition of the print document in step S702, in step S703, the system control unit 101 acquires document information, such as the version of the document, from the file server 20.

When PDL data is received, in step S704, a print image (print image data) is generated within the RIP unit 111 in the image forming apparatus 10.

While PDL data is received from the file server 20 in the above case, other type of data, such as bit map data or metadata, may also be received and printed.

In step S705, a document title, and print history information, such as print layout information specified in step S701, current time, document information acquired in step S703, and a person who executed printing, are stored in the document management unit 104. An example of print history information 500, which is stored in step S705, is illustrated in FIG. 5.

In step S706, printing is carried out by the recording unit 109 of the image forming apparatus 10, then the process is finished.

Figure 8:
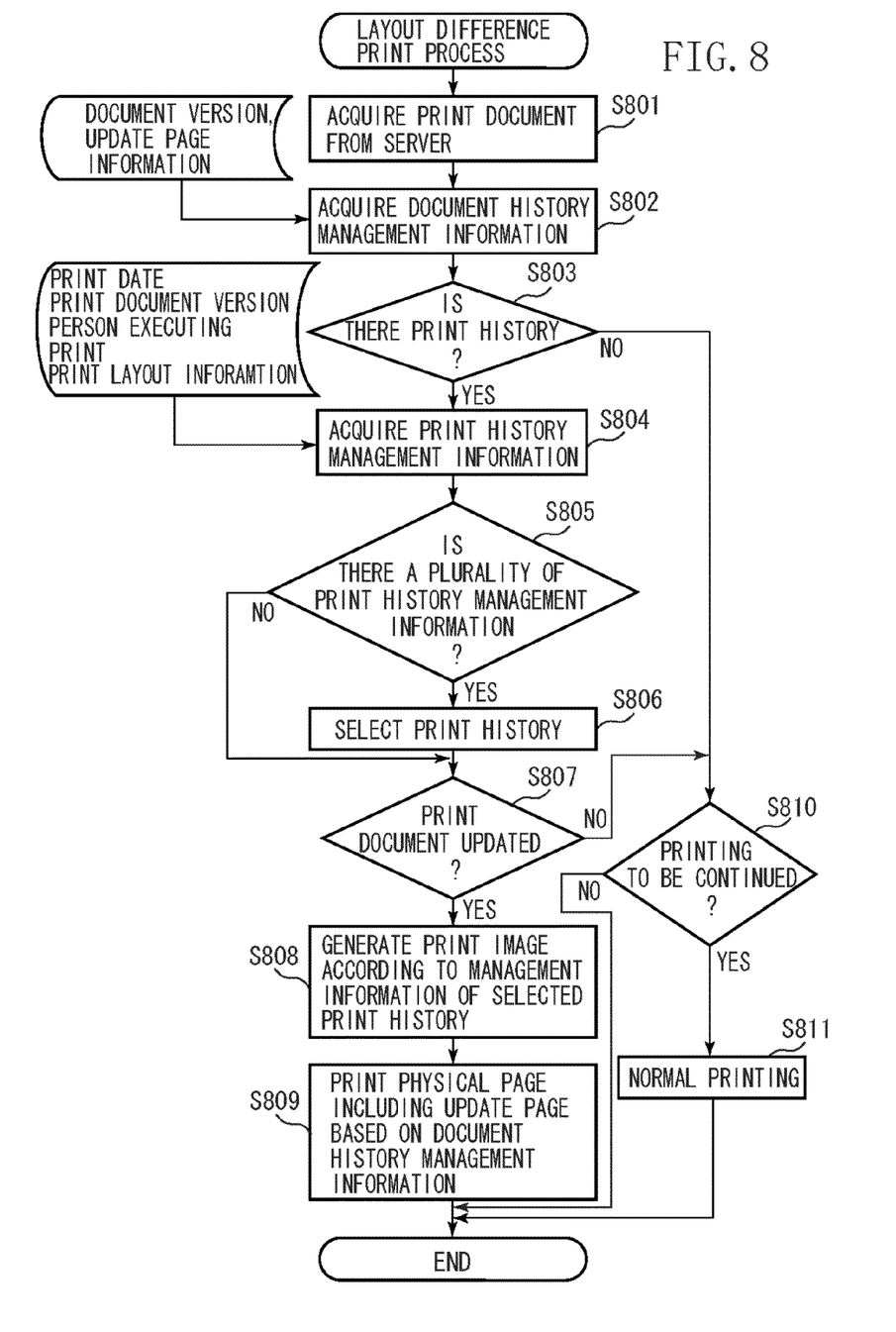
FIG. 8 is a flowchart illustrating a procedure of a layout difference printing process executed by the image forming apparatus in FIG. 2.

FIG. 8 is a flowchart illustrating a procedure of the layout difference printing process executed by the image forming apparatus in FIG. 2.

This flowchart is executed under control of the system control unit 101 of the image forming apparatus 10.

In FIG. 8, when a command to execute the layout difference printing process is received, in response to this command, in step S801, the system control unit 101 acquires a print document from the file server 20

In step S802, the system control unit 101 acquires document history information 400 corresponding to the print document from the file server 20. As illustrated in FIG. 4, the document history information 400 includes the version information and the updated page information.

In step S803, it is determined whether the print document has been printed in the past by the image forming apparatus 10 (to see if there is print history information) This determination is made considering if there is print history information about this print document.

In step S803, if it is determined that the document has not been printed in the past (NO in step S803), difference printing cannot be performed. Accordingly, in step S810, it is determined whether a normal printing process is to be performed.

If normal printing is selected (YES in step S810), in step S811, a normal printing process, including layout instruction, is carried out anew. This normal printing process is the same as the process in the flowchart of FIG. 7.

In step S810, if "normal printing is not performed" is selected (NO in step S810), the process is finished, and the layout difference printing is terminated.

In step S803, if it is determined that the document has been printed in the past (YES in step S803), in step S804, the system control unit 101 acquires print history information about the document.

In step S805, it is determined whether there is a plurality of past print history information, which is acquired in step S804.

In step S805, if it is determined that there is a plurality of past print history information (YES in step S805), in step S806, the print history information is displayed on the screen of the display unit 107, and print history on difference printing is to be performed is selected. An example of the screen image displayed in step S806 is illustrated in FIG. 6.

In step S807, by comparing the document version in the acquired print history information and the document history information acquired in step S802, it is determined whether there is an updated page.

In step S807, if it is determined that there is no updated page (NO in step S807), difference printing cannot be performed. Therefore, in step S810, it is determined whether a normal printing process is to be performed.

In step S810, if normal printing is selected (YES in step S810), in step S811, a normal printing process, including layout instruction, is executed again.

In step S810, if "normal printing is not performed" is selected (NO in step S810), the process is finished, and layout difference printing is terminated.

In step S807, if it is determined that there is an updated page (YES in step S807), in step S808, a print image is generated according to print layout information 504 in the print history information 500 acquired in step S804.

In step S808, when a print image is generated, only a print image which includes an updated page determined in step S807 is identified as a print target out of print images on which layout processing has been performed, and the print image is printed (step S809). In step S809, if "two-sided printing" has been set in print layout information in the print history information acquired in step S804, printing is performed as follows.

If an updated page is included in at least one of print images to be printed in the front side or the reverse side of a paper, print images of the front side and the reverse side of the paper are regarded as print targets and those images are printed, then, the process is finished.

FIG. 9 is a diagram illustrating an example of a physical page to be printed in layout difference printing according to the flowchart in FIG. 8.

Figures 9A, 9B:
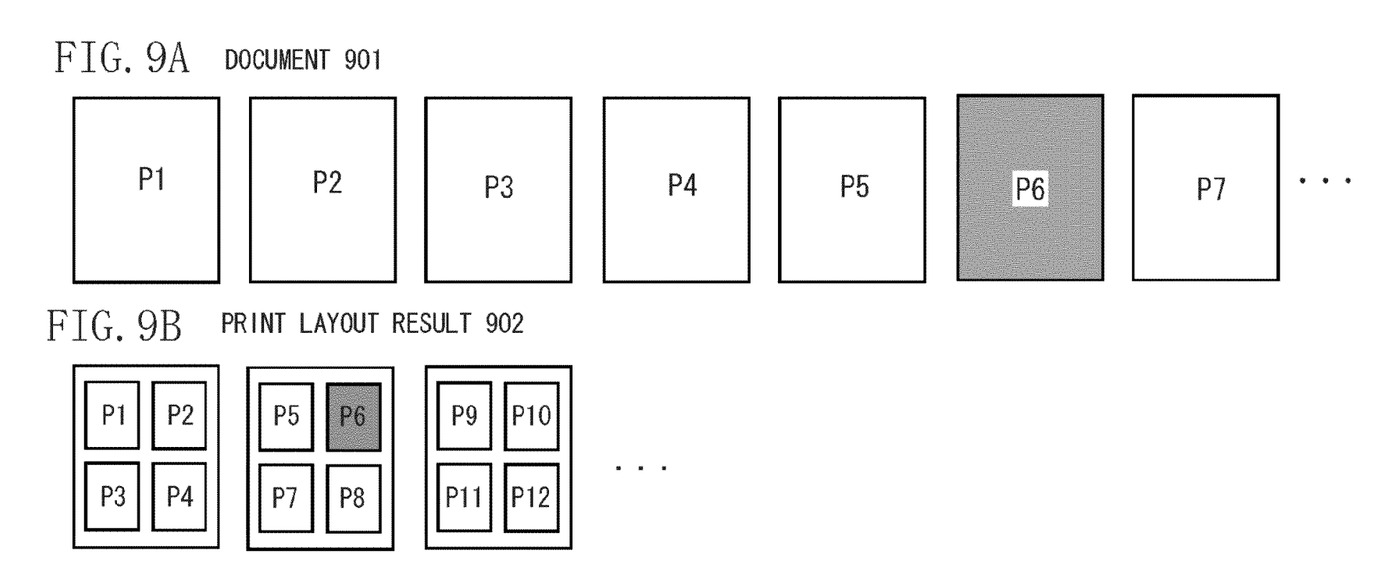
FIG. 9 is a diagram illustrating an example of a physical page to be printed in layout difference printing according to the flowchart in FIG. 8.

In FIG. 9, a document 901 is a document stored in the file server 20. In the document 901, suppose that the contents on page 6 have been updated. Furthermore, suppose that before page 6 was updated, the document was printed in a 4 in 1 layout (image data for 4 pages of the document is arranged in a 2×2 layout on a sheet). In this case, as illustrated in a print layout result 902 in FIG. 9(b), a second physical page, that is, a second page to be printed, needs to be replaced with an updated page.

Figure 9C:
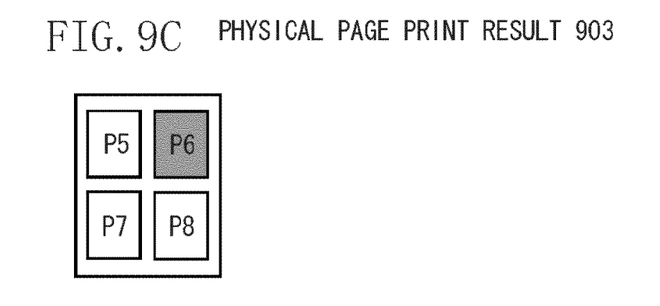

When layout difference printing is performed according to the flowchart in FIG. 8, like a printed physical page 903 as illustrated in FIG. 9(c), besides page 6, the contents of which have been updated, page 5, page 7, and page 8 of the document are also printed together.

As has been described, according to this exemplary embodiment, by issuing a difference printing command, even when the contents of a document have been updated after the document has been printed in a special print layout, the document can be printed automatically in the same print layout as was printed before.

According to the exemplary embodiment of the present invention, there is an advantage that it is not necessary any more to set a special print layout made in the past to replace pages, so that resulting complicated operations can be eliminated.

Further, the physical pages that need to be replaced including an updated page can be printed as they stand. Therefore, it is possible to replace only necessary pages in print products which were printed in the past. As a result, here is no waste of paper and the appearance of print products cannot be spoiled.

According to the present invention, a recording medium storing a program of software that implements the functions above-described exemplary embodiment is supplied to a system or apparatus. The functions of the embodiment can be implemented as the computer (or the CPU or MPU) of the system or apparatus reads and executes the program code stored in the recording medium.

In this case, the functions of the above-described embodiment is implemented by the program code itself read out from the recording medium, and the recording medium that stores the program code constitutes the present invention. Recording media that can be used to supply the program code include, for example, a floppy disk, hard disk, optical disk, magneto-optic disk, CD-ROM, CD-R, DVD, magnetic tape, nonvolatile memory card, and ROM.

The functions of the above-described embodiment are implemented not only by executing the program code read by the computer. In response to commands of the program code, the operating system (OS) running on the computer may perform part or all of the processes, thus implementing the functions of the embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-172246 filed Jul. 1, 2008, which is hereby incorporated by reference herein in its entirety.

What is claimed is:

1. A printing apparatus comprising:
   a first acquiring unit configured to acquire a document to be printed;
   a second acquiring unit configured to acquire update history information about update history of the acquired document;
   a third acquiring unit configured to acquire print history information about print history of the acquired document, wherein the print history information includes print layout information;
   a generating unit configured to generate print image data based on the acquired document;
   a receiving unit configured to receive a command to difference print the acquired document;
   an identifying unit configured to identify, as print target data and from the print image data generated by the generating unit, only those generated print image data which include an updated page, wherein the identifying is based on the updated history information and the print layout information and is in response to the receiving unit receive a command to difference print the acquired document; and
   a printing unit configured to execute printing based on print target data identified by the identifying unit.

2. The printing apparatus according to claim 1, further comprising a selecting unit configured to select a print history corresponding to print image data generated by the generating unit based on the acquired document, in response to there being a plurality of print history information acquired by the third acquiring unit.

3. The printing apparatus according to claim 1, further comprising a first determination unit configured to determine whether the acquired document was printed prior to the first acquiring unit acquiring the document, wherein, in response to the first determination unit determining that the acquired document was not been printed, the printing unit prints all the print image data generated by the generating unit.

4. The printing apparatus according to claim 3, further comprising a second determination unit configured to determine whether there is any updated page in the acquired document based on update history information acquired by the second acquiring unit, wherein, in response to the first determination unit determining that the acquired document was printed and the second determination unit determining that there is not any updated page in the acquired document, the printing unit does not execute printing based on the command to difference print the document received by the receiving unit.

5. The printing apparatus according to claim 1, further comprising an update determining unit configured to determine, in response to the receiving unit receiving a command to difference print the acquired document, whether content on a page of the acquired document has been updated as an updated page,
   wherein the generating unit further is configured to generate, in response to the update determining unit determining that content on a page of the acquired document has been updated as an updated page, print image data based on the print layout information in the print history information.

6. The printing apparatus according to claim 5, wherein the acquired document includes print image data on which print layout processing has been performed, and
   wherein the identifying unit further is configured to identify, as print target data and from the print image data on which print layout processing has been performed, only those generated print image data which include an updated page.

7. The printing apparatus according to claim 5, wherein the update determining unit is configured to determine whether content on a page of the acquired document has been updated as an updated page by comparing a document version in the acquire print history information and the acquired update history information.

8. The printing apparatus according to claim 1, further comprising a first determination unit configured to determine, before the third acquiring unit acquires print history information about print history of the acquired document, whether the acquired document has been printed prior to the first acquiring unit acquiring the document,
   wherein, in response to the first determination unit determining that the acquired document has been printed prior to the first acquiring unit acquiring the document, the third acquiring unit acquires print history information about print history of the acquired document.

9. The printing apparatus according to claim 1, wherein the identifying unit further configured to identify print target data from the print layout information in the print history information acquired by the third acquiring unit.

10. The printing apparatus according to claim 9, wherein the print layout information includes a specified N in 1 layout and, in response to the identifying unit identifying a N in 1 layout as print target data where N is greater than 1, the printing unit executes printing to print out a physical sheet having N pages with at least one page being an updated page.

11. The printing apparatus according to claim 9, wherein the print layout information includes a specified two-sided printing layout and, in response to the identifying unit identifying a two-sided printing layout as print target data, the printing unit executes printing to print a front side and a reverse side of a physical sheet, even though an updated page is printed on only one side of the physical sheet.

12. The printing apparatus according to claim 1, wherein the print layout information indicates how an image was laid out on a paper when the acquired document was printed.

13. A control method for a printing apparatus, the control method comprising:
- acquiring a document to be printed;
- acquiring update history information about update history of the acquired document;
- acquiring print history information about print history of the acquired document, wherein the print history information includes print layout information;
- generating print image data based on the acquired document;
- receiving a command to difference print the acquired document;
- identifying, as print target data and from the generated print image data, only those generated print image data which include an updated page, wherein the identifying is based on the updated history information and the print layout information and is in response to receiving a command to difference print the acquired document; and
- executing printing based on the identified print target data.

14. A non-transitory computer-readable storage medium storing a program that causes a printing apparatus to perform the control method according to claim 13.

15. A printing apparatus comprising:
- a first acquiring unit configured to acquire a print document having print image data on which print layout processing has been performed;
- a second acquiring unit configured to acquire update history information about update history of the print document;
- a third acquiring unit configured to acquire print history information about print history of the print document, wherein the print history information includes print layout information;
- a receiving unit configured to receive a command to difference print the print document;
- an update determining unit configured to determine, in response to the receiving unit receiving a command to difference print the print document, whether content on a page of the print document has been updated as an updated page;
- a generating unit configured to generate, in response to the determining unit determining that content on a page of the print document has been updated as an updated page, print image data based on the print layout information in the print history information;
- an identifying unit configured to identify, as print target data and from print image data on which print layout processing has been performed, only those generated print image data which include an updated page; and
- a printing unit configured to execute printing based on print target data identified by the identifying unit.

\* \* \* \* \*